United States Patent [19]

Snooks

[11] 4,441,382
[45] Apr. 10, 1984

[54] STEERING WHEEL COVER

[75] Inventor: Laura K. Snooks, San Clemente, Calif.

[73] Assignee: Alex S. Reinharcz Enterprises, Inc., San Clemente, Calif.

[21] Appl. No.: 402,755

[22] Filed: Jul. 28, 1982

[51] Int. Cl.³ .............................................. B62D 1/06
[52] U.S. Cl. ................................... 74/558; 150/52 M; 428/64; 428/263
[58] Field of Search .................... 428/31, 64, 263, 290; 150/52 M; 74/558

[56] References Cited

U.S. PATENT DOCUMENTS

| 1,446,628 | 2/1923 | Ridge | 74/558 |
| 1,530,060 | 3/1925 | Ridge | 74/558 |
| 2,618,987 | 11/1952 | Goldstine | 428/31 X |

Primary Examiner—Alexander Thomas

[57] ABSTRACT

An improved steering wheel cover is disclosed formed of a continuous tubular member adapted to tightly conform and be maintained upon a steering wheel without the use of auxiliary fasteners or wrapping cords. The cover is fabricated having a semi-rigid, resilient inner tubular core which frictionally adheres to the circumference of the steering wheel and an outer fabric covering adapted to dissipate heat and cold and provide a substantially slip free hand gripping surface.

5 Claims, 4 Drawing Figures

STEERING WHEEL COVER

BACKGROUND OF THE PRESENT INVENTION

The present invention relates to steering wheel covers and, more particularly, to an improved steering wheel cover comprising a semi-rigid resilient continuous tube adapted to be tightly self-maintained upon a steering wheel without the need of auxiliary fasteners such as thread stitching and/or wrapping cords.

A variety of steering wheels and steering wheel covers have been in the past and are currently being manufactured and marketed to the public to improve the comfort, aesthetics and grip of motor vehicle drivers. Basically, such prior art steering wheels and steering wheel covers may be classified into two general categories, the first being the prefabricated padded leather or vinyl steering wheels typically installed at the factory or obtainable through an after market vehicle supply outlet, and the second being the vinyl steering wheel covers or wraps which may be installed around the circumference of a steering wheel and be maintained thereon by stitching and/or wrapping cords. Although both of these prior art categories have proven generally suitable in the past, they both possess inherent deficiencies which detract from their overall effectiveness and consumer acceptance.

With respect to the prior art prefabricated steering wheels, the foremost deficiency has been their relatively high cost which has rendered the use of the same economically infeasible for the majority of the purchasing public. Further, due to their failure to include any provision in their design to accommodate replacement covers, upon deterioration caused by prolonged use, the entire steering wheel required replacement. The prior art vinyl steering wheel covers or wraps, although being substantially less expensive than the prefabricated padded steering wheels, have typically failed to possess pleasing aesthetics due to their requirement of utilizing a wrapping cord to maintain the same in position upon the steering wheel. Further, after prolonged use, the wrapping cords of such devices typically became loose thereby posing a substantial safety hazard to the driver. In addition, both of the prior art categories of steering wheel and steering wheel covers have been susceptible to becoming hot upon exposure to direct sunlight and have possessed a tendency to promote hand perspiration due to being formed from nonbreathing materials such as leather or vinyl.

Hence, there exists a substantial need in the art for a relatively low cost, aesthetically pleasing steering wheel cover which does not possess the inherent safety deficiencies associated in the prior art.

SUMMARY OF THE PRESENT INVENTION

The present invention specifically addresses and alleviates the above-deficiencies associated in the prior art by providing an improved steering wheel cover formed of a resilient continuous tube adapted to tightly conform and be self-maintained upon a steering wheel without the need of auxiliary fasteners such as stitching and/or wrap cords and, further, is adapted to dissipate heat and cold and provide a substantially slip free hand gripping surface.

More particularly, the present invention comprises a steering wheel cover which is fabricated having a resilient tubular core preferably formed of an elastomeric material and includes a continuous fabric outer surface rigidly adhered to the core. The innermost surface of the steering wheel cover includes a circumferential separation or slotlike opening which permits the core to be manually spread and installed about the steering wheel. Once installed, the resiliency of the elastomeric material causes the core to return back to its initial unstretched configuration. Due to the core of the steering wheel being formed of a resilient elastomeric material, when positioned upon the steering wheel, the steering wheel cover frictionally grips and adheres to the circumference of the steering wheel, thus the same be self-maintained upon the steering wheel without the need of utilizing auxiliary cord wraps or stitching. In addition, due to the fabric covering being integrally applied about the core, the steering wheel cover of the present invention rapidly dissipates heat and cold caused by incident sunlight and low temperature conditions, respectively, retards driver perspiration, and provides a substantially slip free hand gripping surface to the steering cover. Further, due to the core being formed of a resilient elastomeric material, the steering wheel cover of the present invention provides a comfortable padded surface to the steering wheel and approximating the aesthetic qualities of the prefabricated steering wheels of the prior art.

DESCRIPTION OF THE DRAWINGS

These as well as other features of the present invention will become more apparent upon reference to the drawings, wherein.

DETAILED DESCRIPTION OF THE PREFERRED EMBODIMENT

Figure 1:
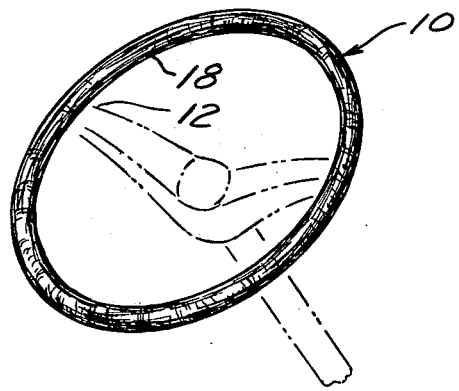
FIG. 1 is a perspective view of a steering wheel assembly showing the improved steering wheel cover of the present invention installed thereon.
Figure 2:
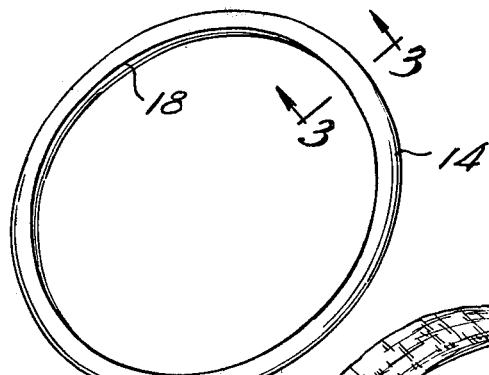
FIG. 2 is an exploded perspective view of the improved steering wheel cover of the present invention showing its inner core and outer fabric layer construction.

Referring to FIG. 1, there is shown the improved steering wheel cover 10 of the present invention installed upon a steering wheel 12 of a motor vehicle (not shown). The steering wheel cover 10 is preferably fabricated having a continuous length hollow tubular core 14 and a continuous length fabric covering 16 formed of cotton, rayon, nylon or the like which is bonded to the exterior surface of the core 14. In the preferred embodiment, the core 14 is formed of an elastomeric material, such as rubber, and is manufactured by a molding process wherein the continuous fabric covering 16 is integrally attached to the core 14 during fabrication. As such, the core 14 and covering 16 is continuous throughout their length without any surface discontinuities as in prior art vinyl steering wheel covers. As an alternative method of manufacture, those skilled in the art will recognize that the core 14 once formed as a continuous member, may be treated by a spray on fiber coating and such spray on coating is contemplated herein.

Figure 3:
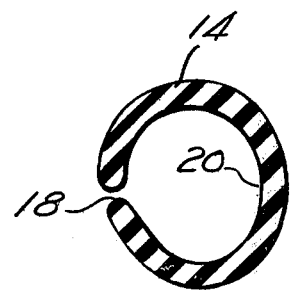
FIG. 3 is a cross-sectional view of the improved steering wheel cover of the present invention taken about lines 3—3 of FIG.2.
Figure 4:
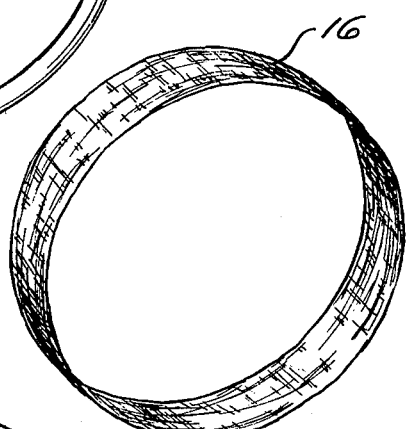
FIG. 4 is a partial perspective view of a portion of the steering wheel cover of the present invention illustrating its core and fabric layer construction.
Figure 4:
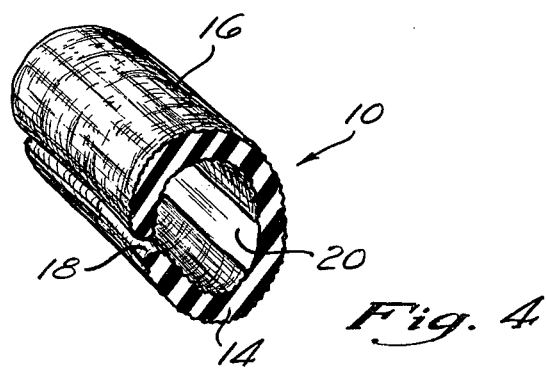

As best shown in FIGS. 3 and 4, the core 14 is formed having a substantially cylindrical cross-sectional configuration and includes a circumferentially extending slot or opening 18 about its innermost diameter which permits the core 14 to be selectively spread open or apart. In addition, the diameter of the core 14 is sized to be equal to or slightly less than the diameter of the steering wheel 12 such that the inner cylindrical or gripping surface 20 of the core 14 tightly contacts the steering wheel 12.

To install the improved steering wheel cover 10 of the present invention upon the steering wheel 12, a user manually spreads the core 14 apart about the opening 18 and stretches the core 14 circumferentially about the steering wheel assembly 12 wherein the steering wheel 12 enters into and resides within the interior of the core 14. Due to the resiliency or memory of the core 14, when positioned circumferentially about the steering wheel 12, the core 14 immediately returns back to its original unstretched configuration as illustrated in FIG. 3, whereby the opening 18 is maintained at a minimum dimension and the core 14 generally encircles and tightly conforms to the configuration of the steering wheel 12. In addition, due to the core 14 being preferably formed of an elastromeric material and having a diametric size equal to or slightly smaller than the circumference of the steering wheel 12, when installed about the steering wheel 12, the inner cylindrical surface of the core 14 tightly grips the steering wheel and prevents relative rotation between the core 14 and the steering wheel 12.

Hence, it will be recognized that the improved steering wheel cover of the present invention is maintained upon the steering wheel 12 without the requirement of any auxiliary stitching or wrapping cords as heretofore utilized in the prior art. In addition, due to the fabric covering 16 extending completely about the outer surface of the core 14, the present invention 10 provides a substantially slipfree gripping surface which further, due to the breathability of the fabric material 16, does not promote perspiration from the hands of the driver. Additionally, by forming the core 14 with suitable color attitudes, heat absorption of the steering wheel cover 10 caused by incident sunlight may be minimized.

Thus, in summary, the present invention provides a relatively low-cost steering wheel cover which tightly conforms and is self-maintained upon a steering wheel without the use of auxiliary wrapping cords or stitchings, provides an aesthetically pleasing appearance, and further, provides a substantially slip-free grip surface to the driver. Although in the preferred embodiment certain materials have been specified for purposes of illustrations, alternative materials can be utilized without departing from the spirit of the present invention and such alternative materials are clearly contemplated herein.

What is claimed is:

1. An improved steering wheel cover comprising:
   a tubular elastromeric member sized to extend about the circumference of a steering wheel, said member formed having a substantially cylindrical cross-sectional configuration sized to tightly conform to the configuration of said steering wheel;
   a circumferentially extending slot formed on the interior surface of said tubular elastromeric member adapted to permit said tubular elastromeric member to extend about and generally encircle the circumference of said steering wheel; and
   a fabric covering disposed in a contiguous orientation to the exterior surface of said tubular elastromeric member, said tubular elastromeric member and said fabric covering being integrally molded together to form a continuous uninterrupted wheel cover member which is self-maintained upon said steering wheel.

2. The steering wheel cover of claim 1 wherein said fabric covering comprises a fabric covering formed for a breathable fabric material adapted to dissipate heat.

3. The steering wheel cover of claim 2 wherein said elastromeric material is rubber.

4. The steering wheel cover of claim 3 wherein said fabric covering comprises a cotton fabric.

5. The steering wheel cover of claim 4 wherein said fabric covering comprises a nylon fabric.

* * * * *